US012565186B2

(12) United States Patent
Bonardo

(10) Patent No.: US 12,565,186 B2
(45) Date of Patent: Mar. 3, 2026

(54) VALVE UNIT FOR AN ANTI-LOCK BRAKING SYSTEM

(71) Applicant: RAICAM DRIVELINE S.R.L., Mondovi' (IT)

(72) Inventor: Sandro Bonardo, Peveragno (IT)

(73) Assignee: RAICAM DRIVELINE S.R.L., Mondovi (IT)

( * ) Notice: Subject to any disclaimer, the term of this patent is extended or adjusted under 35 U.S.C. 154(b) by 470 days.

(21) Appl. No.: 18/253,994

(22) PCT Filed: Nov. 23, 2021

(86) PCT No.: PCT/IB2021/060852
§ 371 (c)(1),
(2) Date: May 23, 2023

(87) PCT Pub. No.: WO2022/112936
PCT Pub. Date: Jun. 2, 2022

(65) Prior Publication Data
US 2024/0092332 A1 Mar. 21, 2024

(30) Foreign Application Priority Data
Nov. 25, 2020 (IT) ........................ 102020000028418

(51) Int. Cl.
*B60T 15/02* (2006.01)
*B60T 8/32* (2006.01)
(Continued)

(52) U.S. Cl.
CPC .............. *B60T 15/028* (2013.01); *B60T 8/32* (2013.01); *B60T 8/366* (2013.01); *B60T 8/4225* (2013.01); *B60T 2270/10* (2013.01)

(58) Field of Classification Search
CPC ........................... B60T 15/028; B60T 2270/10
(Continued)

(56) References Cited

U.S. PATENT DOCUMENTS 3,879,090 A 4/1975 Holmes
4,457,563 A * 7/1984 Farr ...................... B60T 8/4225
303/122.13
(Continued)

FOREIGN PATENT DOCUMENTS

DE 4440986 A1 5/1995
DE 10158382 A1 6/2003
EP 3392105 A2 10/2018

OTHER PUBLICATIONS

International Search Report for International Patent Application No. PCT/IB2021/060852, mailed Feb. 2, 2022.

*Primary Examiner* — Thomas J Williams
(74) *Attorney, Agent, or Firm* — Armstrong Teasdale LLP

(57) ABSTRACT

A valve unit for an anti-lock braking system has a valve body, a piston, and an elastic element acting on the piston. The valve body has an outlet port, an inlet port, a primary chamber communicating with the outlet port, an expansion chamber with an outflow passage establishing fluid communication between the primary chamber and the expansion chamber, and a bypass passage between the inlet port and the outlet port. The piston is movable in the primary chamber and has a longitudinal through cavity, a first transversal surface facing the outlet port, and a second transversal surface facing away from the outlet port. The first transversal surface has an area smaller than the area of the second transversal surface. The elastic element exerts an elastic force to move the piston away from the outlet port. The valve unit is activatable by pressure of a brake fluid in the primary chamber.

18 Claims, 6 Drawing Sheets

(51) Int. Cl.
    *B60T 8/36*          (2006.01)
    *B60T 8/42*          (2006.01)

(58) Field of Classification Search
    USPC .......... 303/115.6, 156, 157, 158, 175, 113.1;
                           188/181 R, 181 A, 181 T
    See application file for complete search history.

(56) References Cited

U.S. PATENT DOCUMENTS

| | | | | |
|---|---|---|---|---|
| 4,714,301 A | * | 12/1987 | Farr | B60T 8/74 |
| | | | | 303/115.6 |
| 4,721,346 A | * | 1/1988 | Hurst | B60T 8/34 |
| | | | | 303/115.6 |
| 4,725,104 A | * | 2/1988 | Yardley | B60T 8/4225 |
| | | | | 303/115.6 |
| 4,730,705 A | * | 3/1988 | Farr | B60T 8/74 |
| | | | | 303/115.6 |
| 5,108,160 A | * | 4/1992 | Alaze | B60T 8/5093 |
| | | | | 303/115.6 |
| 5,372,412 A | | 12/1994 | Yagi | |
| 2024/0067152 A1 | * | 2/2024 | Bonardo | B60T 8/329 |
| 2024/0226243 A9 | * | 7/2024 | Mrsny | A61K 38/20 |

* cited by examiner

VALVE UNIT FOR AN ANTI-LOCK BRAKING SYSTEM

CROSS-REFERENCE TO RELATED APPLICATIONS

This application is a National Stage Application of International Patent Application No. PCT/IB2021/060852, having an International Filing Date of Nov. 23, 2021, claiming priority to Italian Patent Application No. 102020000028418, having a filing date of Nov. 25, 2020, each of which is hereby incorporated by reference in its entirety.

TECHNICAL FIELD

The present invention relates to a valve unit for a hydraulic braking system to control the anti-lock function of a wheel of a vehicle. The valve system is applicable to both motorized and non-motorized vehicles, such as bicycles.

BACKGROUND ART

Anti-lock Braking Systems ("ABS") have been installed on vehicles with hydraulic brakes to prevent skidding, or uncontrolled slippage, reducing the effects of an abrupt stop. One such system is illustrated in FIG. 1, where the four wheels of a motor vehicle are equipped with brake discs E1-E4 and related sensors S1-S4 operatively facing phonic wheels F1-F4 or equivalent elements, rotationally integral with the brake discs. The sensors S1-S4, according to known modes, detect the rotation speeds of the wheels to which they are associated and send, for example through wiring N1-N4, signals indicative of the rotation speeds to an Electronic Control Unit (ECU) or module which processes the speed signals received. Each brake disc is associated with a brake caliper G1-G4. A master cylinder M operated by a foot control C activates the brake calipers through respective hydraulic lines H1-H4, on each of which a valve unit ABS1-ABS4 is installed. Each ABS valve unit controls the flow and pressure of brake fluid to the associated brake caliper in response to electrical control signals from the electronic control unit ECU. When the ECU detects a condition indicative of an impending wheel lockup, it actuates the respective ABS valve to reduce the hydraulic pressure on the brake at the affected wheel, thereby reducing the braking force on this wheel, so that the wheel remains braked but may rotate. This process is repeated continuously during braking, several times per second, preventing the vehicle from slipping.

DE 101 58 382 A1 discloses an anti-lock braking system for a bicycle comprising master and slave hydraulic cylinders integrated into a hydraulic actuator forming a hydraulically closed compact unit with outlet and check valves and a low-pressure liquid hydraulic reservoir. The system also comprises an electronic controller, at least one wheel brake, at least one speed sensor, and a hydraulic actuator with a low-pressure hydraulic fluid reservoir connected to a discharge valve and an isolation valve. A check valve is connected in parallel with the discharge valve and a hydraulic slave cylinder is connected downstream of the isolation and discharge valves.

EP 3 392 105 A2 describes a hydraulic braking system for a bicycle, including two electrically operated valve assemblies. Each valve assembly is operated separately from the other by a respective electric actuator. A first valve assembly is used to block the brake fluid between the master cylinder and the brake calipers, and a second valve assembly is used to open a parallel channel that hydraulically connects the brake caliper to an accumulator. The two electric actuators are individually powered by the ECU in a predetermined sequence. The two valve assemblies are positioned on parallel branches of a hydraulic circuit that connects a main cylinder operated by a hand lever, and a brake caliper. During normal braking, a first valve assembly is open, allowing direct fluid communication between the master cylinder and the brake caliper, while the second valve assembly is closed. Under hard braking conditions, in an impending wheel lock-up, a first electric actuator closes the first valve assembly, thus blocking the pressure input from the hand lever, so that the pressure is blocked from the first valve assembly to the caliper, preventing a further increase in pressure acting on the caliper. A second electric actuator opens the second valve, allowing the pressure to discharge into the accumulator, which is located upstream of the second valve in the parallel channel. As a result, the pressure on the caliper is reduced, releasing the brake.

Other ABS systems comprise a valve unit comprising a piston that is mounted in the hydraulic line. The piston is controlled by an electric actuator (solenoid) that makes the piston move back and forth in order to change the volume in the hydraulic line and thus modulate the pressure in the braking circuit.

SUMMARY OF THE INVENTION

In light of the prior art, a primary object of this invention is to provide an ABS valve unit that may be activated, to intervene in conditions of locking a braked wheel, not by an electrical control of a conventional actuator.

The present invention provides an ABS valve unit that is actuated by brake fluid pressure present in the hydraulic circuit of the brake system.

According to one aspect, the present invention discloses a valve unit for a hydraulic braking system to control the anti-lock function of a wheel of a vehicle. Preferred embodiments of the present invention are also described.

In summary, a valve unit for an anti-lock braking system of a vehicle comprises a valve body, a movable piston in the valve body, and an elastic element acting on the piston. The valve body has an outlet port that may be hydraulically connected to a brake caliper, an inlet port that may be hydraulically connected to a master cylinder, a primary chamber in fluid communication with the outlet port, an expansion chamber with an outflow passage that achieves fluid communication between the primary chamber and the expansion chamber, and a bypass passage that achieves fluid communication between the inlet port and the outlet port. The piston is movable longitudinally in the primary chamber and has a longitudinal cavity extending through the piston between an end face of the piston, facing the outlet port, and a transversal passage that opens onto a lateral surface of the piston. The piston has collectively a first transverse surface, facing away from the outlet port, and a second transversal surface opposite the first transversal surface and facing away from the outlet port, and where the first transversal surface has an area smaller than the area of the second transversal surface. The elastic element exerts an elastic force to move the piston away from the outlet port. The piston has two alternative operational positions:

a first position, under normal braking conditions, in which the elastic force of the elastic element prevails over the longitudinal component of the hydraulic thrust of the brake fluid present in the primary chamber, whereby the piston is moved away from the outlet port and occludes the outflow passage without occluding the bypass passage, and a second position, in conditions of activation of the valve unit, in which the hydraulic thrust of the brake fluid present in the primary chamber has a longitudinal component that prevails over the force exerted by the elastic element, whereby the piston is displaced towards the outlet port and occludes the bypass passage while not occluding the outflow passage.

BRIEF DESCRIPTION OF THE DRAWINGS

In order for the present invention to be clearly understood, a few preferred embodiments will now be described, provided by way of example, with reference to the appended drawings, wherein.

DETAILED DESCRIPTION OF THE INVENTION

Figure 1:
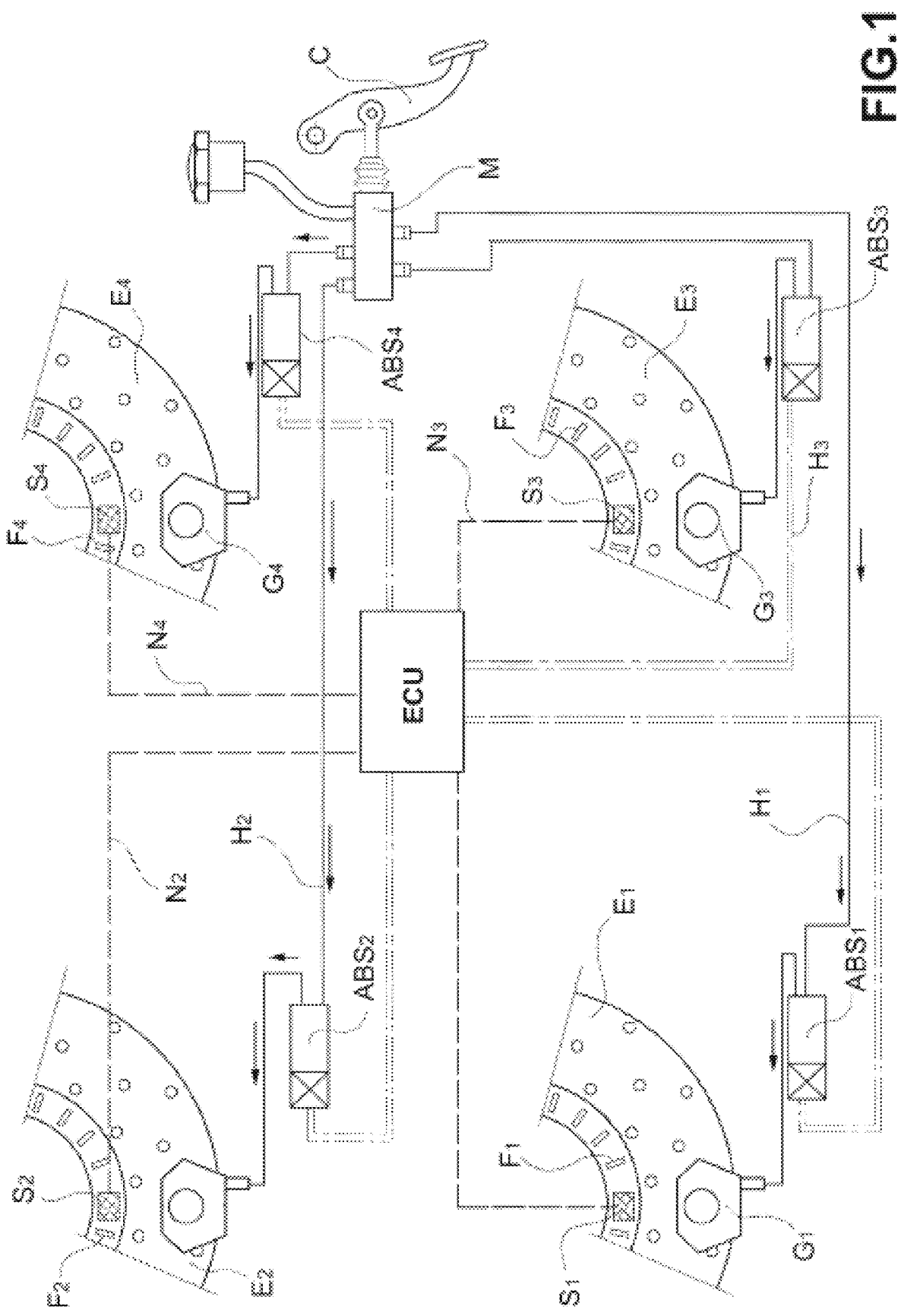
FIG. 1 is a diagram that schematically represents the operation of an anti-lock braking system on a vehicle.

Referring to FIGS. 2 to 5, reference number 10 designates as a whole an ABS valve unit for an anti-lock braking system for a wheel of a vehicle. The valve unit 10 defines a longitudinal axis x and has an elongated shape in the direction defined herein as longitudinal or axial. In the sense used in this context, terms such as "longitudinal" and "transversal" will be understood in reference to the x-axis.

The valve unit 10 comprises a body 11 (or housing) made of plastic material defining an actuation direction referred to herein as "longitudinal." The body 11 has, in this example, an overall cylindrical tubular shape, with a first end 12 and a second end 13 opposite the first end.

The end 12 of the body 11 forms an outlet port (or exit port) 14, hydraulically connectable to a brake caliper (not shown) of a brake for a wheel of a vehicle, and an inlet port 17, hydraulically connectable to a master cylinder (or principal cylinder, not shown), which is operatively associated with an actuation control by a foot pedal or hand lever (not shown) on the vehicle.

The body 11 includes a primary hydraulic chamber 15 and an expansion chamber 16, or secondary hydraulic chamber. The primary hydraulic chamber 15 communicates directly with the outlet port 14 and longitudinally receives a piston 18 in a slidable manner.

The primary hydraulic chamber 15 forms a first end section 19 (or distal section) having a diameter D1 closer to the outlet port 14, a second intermediate section 20 having a diameter D2 greater than the diameter D1, and a third section 21 (or proximal section) having a diameter D3 less than the diameter D1, further away from the outlet port 14.

The piston 18 comprises an end portion 22 received in the end section 19 of the primary chamber 15, an intermediate portion 23 received in the intermediate section 20 of the primary chamber 15, and a proximal portion 24 received in the proximal section 21 of the primary chamber 15.

The end portion 22 of the piston 18 is provided with a pair of longitudinally adjacent sealing end gaskets 26, 27 which are spaced a short distance apart; the gaskets 26, 27 are in sliding contact with the end section 19 of the primary chamber 15. The intermediate portion 23 of the piston 18 is provided with a pair of intermediate gaskets 28, 29 longitudinally adjacent and spaced a short distance apart, which engage with the intermediate section 20 of the primary chamber 15. A proximal sealing gasket 30 is mounted on the proximal portion 24 of the piston so as to sealingly engage with the proximal section 21 of the primary chamber 15.

The piston 18 forms a longitudinal cavity 31 that extends through the piston between an end face 32 of the end portion of the piston, facing the outlet port 14, and a transversal passage 33 that discharges onto a side surface of the piston. The transversal passage 33 flows onto the intermediate section 20 of the primary hydraulic chamber 15.

In the portion 13 of the body 11 opposite the end having the inlet ports 17 and the outlet ports 14, a primary elastic element 34 is received, which urges the piston 18 away from the outlet port 14.

In the embodiment of FIG. 2-5, the primary elastic element 34 is formed as a single compression spring, compressed longitudinally between a shoulder 35 of the body 11 and a transversal contrast wall 36, facing the shoulder 35 and longitudinally spaced therefrom. Alternative embodiments to the one shown may involve more than one elastic element, for example two springs, one of which is already prestressed and only one supported, to provide different levels of preload along a short longitudinal stroke.

The transversal contrast wall 36 is received with transversal play and is longitudinally movable within a chamber 38 advantageously formed by the body 11.

A stem 37 connects the transversal contrast wall 36 to the piston 18 and makes it longitudinally integral therewith.

Longitudinal compression of the primary elastic element 34 pushes the transversal contrast wall 36 to the left, and this consequently pulls the piston 18 to the left via the stem 37.

The longitudinal distance between the transversal contrast wall 36 and the shoulder 35 may be adjusted to vary the longitudinal elastic force with which the primary elastic element pulls the piston 18 away from the outlet port 14.

According to an embodiment, the stem 37 may be made as a threaded stem that engages through a corresponding threaded through-hole 39 formed through the transversal contrast wall 36.

The stem 37 may have an enlarged terminal head 40 with a circular cross section, for example spherical, engaged in a corresponding recess 41 formed in the portion 24 of the piston 18.

An adjusting device 42 may be envisaged to adjust the elastic force with which the piston 18 is urged away from the outlet port 14. The adjusting device 42 may vary the longitudinal position of the transversal contrast wall 36 along the stem 37, thereby adjusting the distance between the transversal contrast wall 36 and the shoulder 35 and consequently the length of the primary elastic element 34 and its compression. By rotating the stem 37 in a given rotation direction about its longitudinal axis 37A by means of the adjusting device 42, so as to further compress the primary elastic element 34 and thus shorten it longitudinally, the traction force by which the piston 18 is moved away from the outlet port 14 is consequently increased. Conversely, by rotating the stem 37 in an opposite direction of rotation, the primary elastic element 34 is decompressed and allowed to elongate longitudinally, thereby reducing the traction force by which the piston 18 is pulled away from the outlet port 14.

The stem 37 has a central longitudinal axis 37A preferably eccentric with respect to the longitudinal central axis 18A of the piston 18. In this way, a rotation imparted to the stem 37 about its axis 37A during the phase of adjusting the position of the transversal contrast wall 36 does not cause an undesired rotation also of the piston 18 about the axis 18A thereof, with consequent wear on the sealing gaskets mounted on the piston 18 and acting against the walls of the primary hydraulic chamber 15. As an alternative to the aforementioned eccentric arrangement of the axes, different embodiments (not shown) may provide for anti-rotation elements, such as, for example, transversal teeth projecting radially from the piston 18 and/or the transversal contrast wall 36.

Transversal play between the edges of the transversal contrast wall 36 and the chamber 38 is desirable to reduce friction during the longitudinal movement of the piston 18 together with the wall 36. To ensure that the rotation imparted to the stem 37 causes a screwing or unscrewing relative to the contrast wall 36, it is preferred that this at least one portion of the peripheral edge of the wall 36 has a transversal distance P1 from the axis 37A greater than a minimum transversal distance P2 between the axis 37A and the inner surface of the chamber 38. In this way, the inner surface of the chamber 38 acts as a contrast wall to rotationally block the transversal wall 36 when the stem 37 is rotated.

According to one embodiment, the adjusting device 42 that rotates the threaded stem 37 comprises an electric drive controlled by an electronic control unit (ECU, FIG. 1), mounted on board the vehicle, which may adjust the elastic force of the primary elastic element 34 as needed, as explained below.

In the primary chamber 15, the brake fluid present in the first end section 19 closer to the outlet port 14 acts on a circular area of the piston 18 having a circumference of diameter D1, defined by the gaskets 26, 27. The brake fluid present in the first section, between the outlet port 14 and the sealing gasket 27, exerts a longitudinal thrust on the piston 18 directed to the left (direction A) in the accompanying drawings, away from the outlet port 14.

The brake fluid contained in the second intermediate section 20 of the primary chamber 15 exerts a longitudinal hydraulic thrust on an area of the piston determined by a circular crown having an outer circumference of diameter D2, corresponding to the diameter of the second intermediate section 20 of the primary chamber 15, and an inner circumference of diameter D3, corresponding to the diameter of the third section 21 of the primary chamber 15, farther from the outlet port 14. The hydraulic thrust of the brake fluid in the second intermediate section 20 of the primary chamber is directed to the right in the accompanying drawings and pushes the piston 18 closer to the outlet port 14.

The diameters D1, D2, and D3 of the respective three sections 19, 20, and 21 of the primary chamber, and the diameters of the corresponding portions 22, 23, and 24 of the piston 18, are chosen such that the area of a circular crown delimited by the diameters D2 and D3 is greater than the area of a circle having diameter D1. Consequently, the overall hydraulic thrust acting on the piston 18 has a longitudinal resultant that acts on the piston 18 pushing it closer to the outlet port 14.

The overall hydraulic thrust acting on the piston 18 is therefore directed in the direction opposite to the stress produced by the primary elastic element 34, which acts on the piston 18 away from the outlet port 14.

A first bypass passage 50 is formed in the body 11 of the valve assembly and opens onto the end section 19 of the primary hydraulic chamber 15, placing this chamber in fluid communication with the inlet port 17. An outflow passage 51 is formed in the body 11 of the valve unit and opens onto the intermediate section 20 of the primary hydraulic chamber 15, placing this chamber in fluid communication with the expansion chamber 16.

The expansion chamber 16 receives a floating valve element 61 having a sealing gasket 62 that engages with a cylindrical portion 63 of the expansion chamber 16 in a longitudinally slidable manner. The floating valve element 61 is movable within the expansion chamber 16 between a shoulder 64 formed closer to the inlet port 17, and a transversal wall 67 farther from the inlet port 17.

The outflow passage 51 flows onto the expansion chamber 16 at a point positioned longitudinally closer to the inlet port 17. The outflow passage 51 opens at a first end of the cylindrical section 63 of the expansion chamber 16 further from the inlet port 17.

A secondary spring element 66, such as a compression spring, is elastically compressed between the floating valve element 61 and the transversal wall 67 of the valve body 11. The secondary spring element 66 urges the floating valve element 61 in the direction B toward the end 12 of the valve body 11, thus toward the inlet port 17. As described below, the introduction of pressurized brake fluid from the primary chamber 15 into the expansion chamber 16 causes the floating valve element 61 to move in the direction A, longitudinally away from the outlet port 14 and the inlet port 17, in contrast to the force of the secondary spring element 66, resulting in an immediate reduction of the pressure in the primary chamber 15 and in the branch of the hydraulic circuit extending from the outlet port 14 to the brake caliper.

The expansion chamber 16 is in fluid communication with the inlet port 17 through a channel 68 formed in the body 11, wherein a one-way valve 69 is mounted between the expansion chamber 16 and the inlet port 17. The one-way valve 69 comprises a ball 70 and a spring 71, which pushes the ball 70 away from the inlet port 17 so as to occlude the channel 68. The one-way valve 69 allows brake fluid to flow through it in only one direction, from the expansion chamber 16 toward the inlet port 17.

In the illustrated embodiment, a transversal passage 72 is cut into the valve body 11 for constructive reasons to facilitate the construction of the bypass passage 50. The transversal passage 72 is permanently closed by a plug.

For constructional reasons, the body 11 may comprise two or more complementary parts, in this example a main part 11a and a connecting part 11b. The main portion 11a forms the primary hydraulic chamber 15, the expansion chamber 16 and the inlet port 17, and the outlet port 14. The connecting portion 11b is tightly coupled to the main portion 11a by means of a gasket 74.

Figure 2:
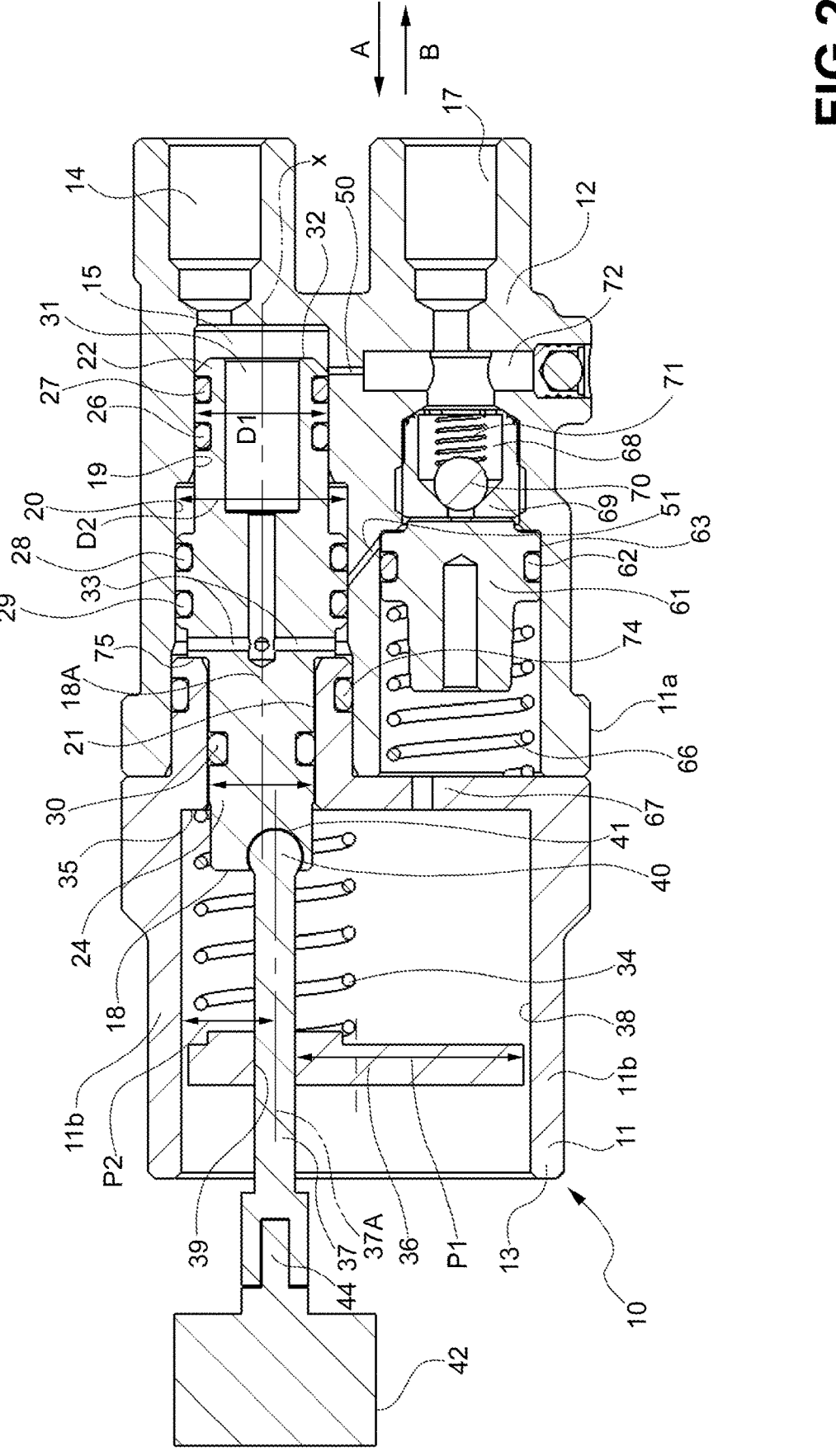
FIG. 2 is a longitudinal cross-sectional view of a valve unit according to a first embodiment of this invention, in a first operational condition.
Figure 3:
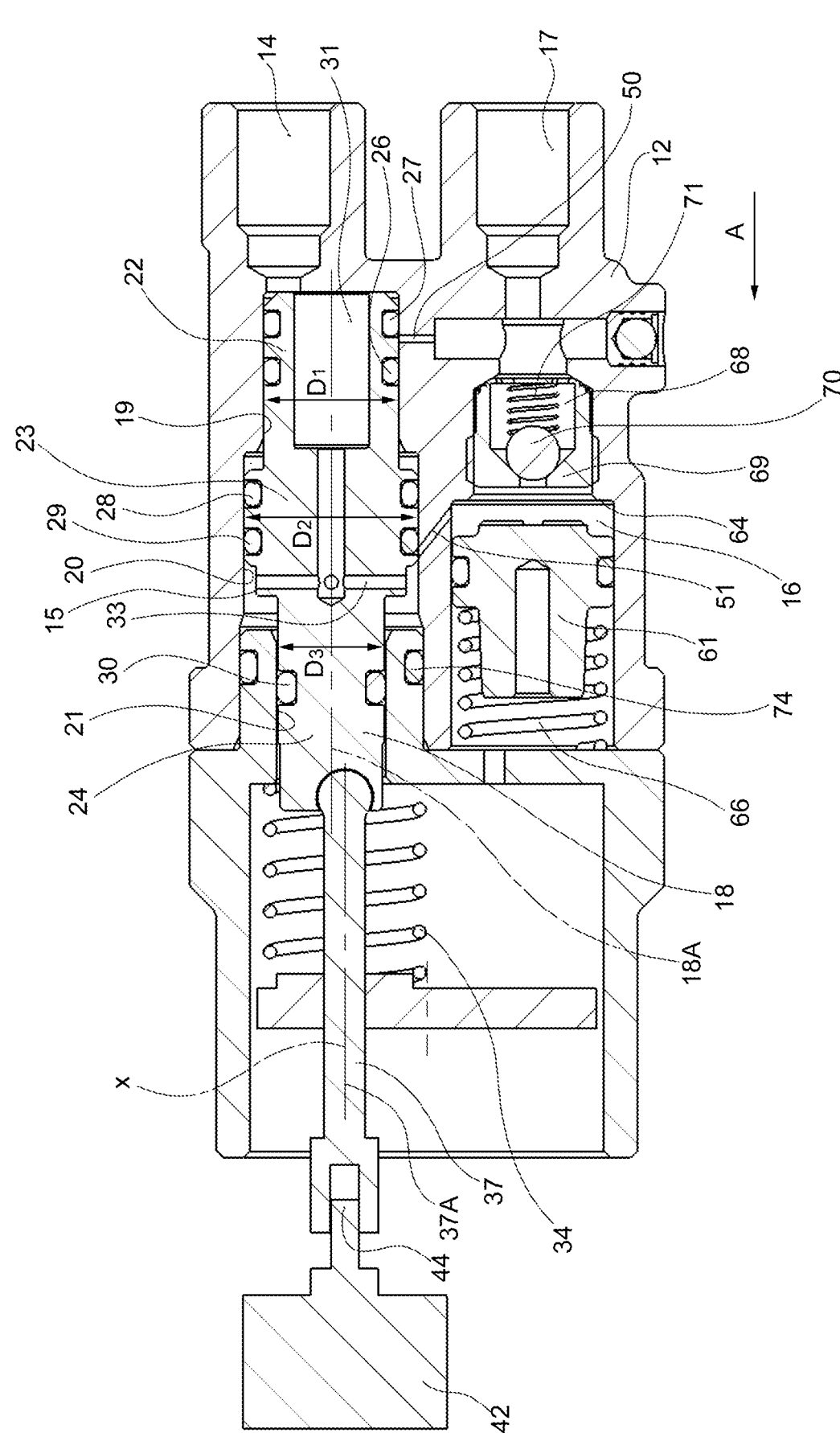
FIG. 3 through 5 illustrate the valve unit in FIG. 2 under other operational conditions.

FIG. 2 illustrates the valve unit 10 under normal braking conditions, i.e., when the vehicle is braking but the wheel receiving the brake fluid from the outlet port 14 is not locked, and therefore does not slip. Brake fluid fills the primary chamber 15, both in the first terminal section 19 and in the second intermediate section 20, due to the longitudinal through cavity 31. The primary elastic element 34 exerts an action that pulls the piston 18 to the left (direction A), overriding the hydraulic thrust that as a whole produces a resultant that tends to push the piston 18 to the right (direction B).

For moderate hydraulic pressures, occurring in a normal braking condition, i.e., without reaching a locked condition of the braked wheel, the hydraulic thrust given by the pressure acting on a thrust area given by the difference between the area of the circular crown having diameters D2 and D3 and the area of the circle having diameter D1, has a resultant with longitudinal component of less intensity with respect to the longitudinal force exerted by the primary elastic element 34.

Under normal braking conditions, the elastic force of the primary elastic element 34 overrides the hydraulic thrust and holds the piston 18 displaced to the left, away from the outlet port 14, in a rest position (or retracted position). In the rest position, the piston 18 may be in abutment against a transversal shoulder 75 formed by the body 11.

When the piston 18 is in the rest position (FIG. 2), it does not occlude the bypass passage 50, allowing direct transit of brake fluid from the inlet port 17 to the outlet port 14. The anti-lock braking system is not active. In the rest position of the piston, the outflow passage 51 between the primary chamber 15 and the expansion chamber 16 is instead closed between the two gaskets 28, 29 on the second portion 23 of the piston 18.

In locked wheel braking conditions, the pressure of the brake fluid present in the primary hydraulic chamber 15 rises, reaches, and exceeds a value whereby the resultant of the overall hydraulic thrust acting on the piston 18, from left and right, has a longitudinal component of greater intensity and opposite direction with respect to the elastic force exerted by the primary elastic element 34. Therefore, the brake fluid pressure in the primary hydraulic chamber 15 thrusts the piston 18 to the right (direction B, FIG. 3), moving it away from the outlet port 14 further compressing the primary elastic element 34.

The piston 18, by moving toward the outlet port 14, closes the bypass passage 50 between the gaskets 26, 27 (FIG. 3), whereby the flow of brake fluid from the master cylinder to the brake caliper through the valve unit is interrupted. At the same time, the piston 18 opens the outflow passage 51 between the primary chamber 15 and the expansion chamber 16, whereby some of the brake fluid vents from the primary hydraulic chamber 15 to the expansion chamber 16.

The pressure of the brake fluid entering the expansion chamber 16 thrusts the floating valve element 61 away from the inlet port 17 (to the left, direction A), overcoming the elastic force of the secondary spring 66. The volume of the expansion chamber 16 then increases and, as a result, the brake fluid pressure in the primary chamber 15 is instantaneously reduced.

Due to the longitudinal through cavity 31 in the piston 18, the pressure reduction in the primary hydraulic chamber 15 also simultaneously reduces the brake fluid pressure in the branch of the hydraulic circuit extending from the outlet port 14 to the brake caliper. The braking force exerted by the brake caliper is thus decreased, unlocking the wheel.

The pressure reduction in the primary hydraulic chamber 15 causes the elastic force of the primary elastic element 34 to again prevail over the longitudinal resultant of the hydraulic thrust, whereby the primary spring element 34 relaxes, pulls the piston 18 to the left away from the outlet port 14 again, reopening the bypass passage 50 and closing the outflow passage 51. As a result, the master cylinder is again in fluid communication with the brake caliper.

When the bypass passage 50 is reopened, the expansion chamber 16 (FIG. 2) still contains some brake fluid because the floating valve element 61 has moved in the direction A. The volume of brake fluid contained in the expansion chamber 16 must be returned to the hydraulic circuit so that the brake control (foot or hand lever) may return to its initial rest position. Releasing the brake control decreases the pressure in the hydraulic circuit, so that the secondary spring 66 may expand and move the floating valve element 61 toward the inlet port 17 (direction B), essentially emptying the expansion chamber 16 (FIG. 2) and reintroducing brake fluid into the hydraulic circuit. The emptying of the expansion chamber 16 is made possible by the one-way valve 69, which closes automatically due to the action of the spring 71 associated with the ball 70.

Figure 4:
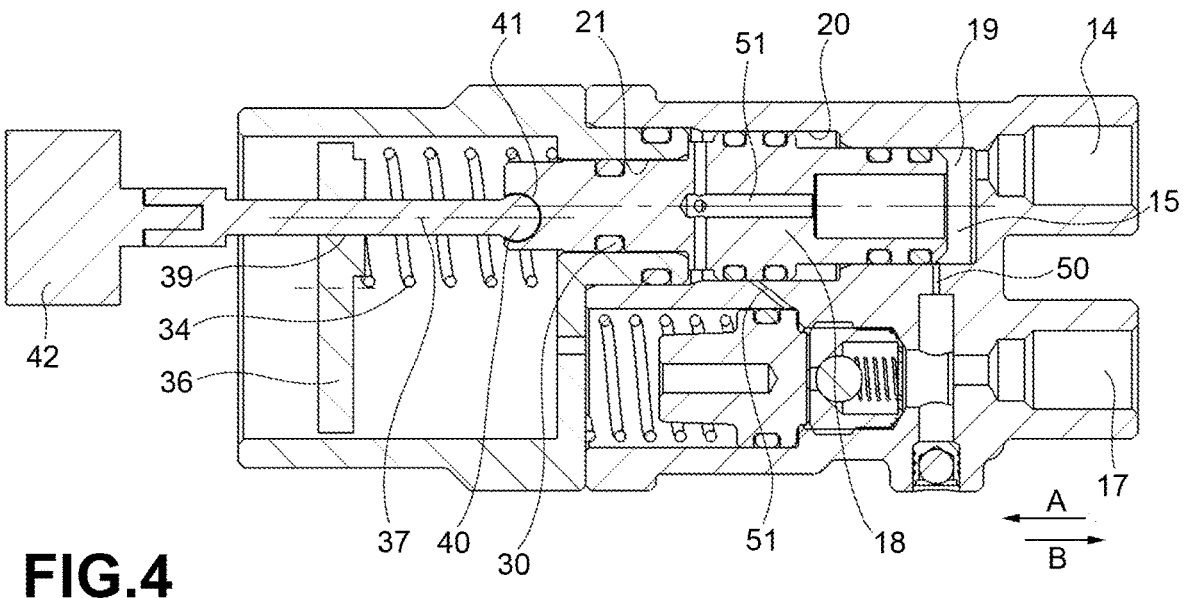
Figure 5:
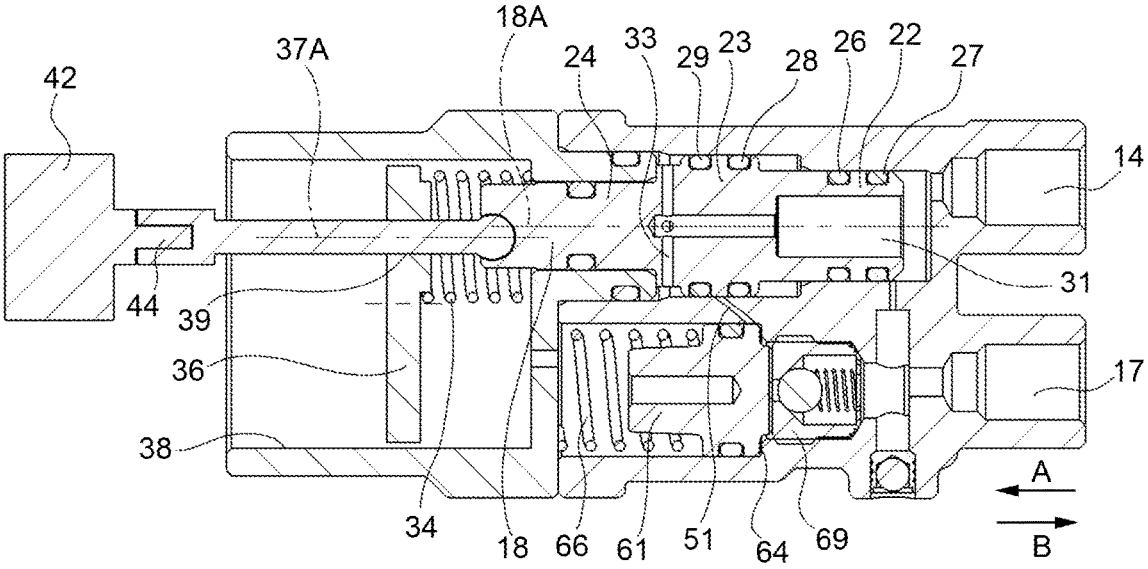

In the embodiment illustrated in FIG. 2-5, the minimum force to cause the piston 18 to move, and thus to trigger the anti-locking function, is adjustable. The adjustment is made by applying greater or lesser elastic preload to the primary elastic element 34, as required. If the compression preload of the primary elastic element 34 is low, a relatively low level in the hydraulic pressure of the brake fluid in the primary chamber 15 will be sufficient to overcome the elastic resistance that keeps the piston 18 (to the left) away from the outlet port 14. A low level of preload is achievable in this example by means of the adjusting device 42, which rotates the stem 37 in a direction that moves the transversal contrast wall 36 away from the transversal shoulder 35 (FIG. 4). When the longitudinal length of the primary elastic element 34 is greater, the compressive force with which this elastic element holds the piston at rest is low. Therefore, a peak hydraulic pressure that is not high will be enough to trigger the ABS system. Such a low-pressure adjustment is preferable when the vehicle is traveling on slippery, icy, or unpaved roads, along which braked wheels may lock more easily with modest hydraulic pressures.

Conversely, for travel on paved road surfaces, with a higher grip coefficient, a wheel slip condition occurs at higher hydraulic pressure levels. Therefore, for driving on non-slippery asphalt roads, the preload on the primary elastic element 34 may be increased by rotating the stem 37 by means of the adjusting device 42 in such a way as to bring the transversal contrast wall 36 closer to the transversal shoulder 35, thereby shortening and further pre-compressing the primary elastic element 34. With a shorter longitudinal length of the primary elastic element 34, the compressive force with which this elastic element holds the piston 18 in its rest position increases. Consequently, a higher peak hydraulic pressure will be required to overcome the elastic force and trigger the ABS system.

In embodiments where the adjusting device 42 is electrically controllable, it may be activated by an electrical signal from the vehicle's on-board electronic processing unit (ECU) when the ECU receives speed signals from the wheel sensors indicative of a locking or slipping situation.

The stem 37 and the transversal contrast wall 36 are longitudinally integral with the piston 18. Preferably, the adjusting device 42 is rotationally coupled to the stem 37 but longitudinally disengaged therefrom, for example by means of a splined axial coupling 44, so as not to increase the inertial mass longitudinally integral with the piston 18.

As will be appreciated, the ABS system may be activated even in the absence of an electrical control and electrical power supply, since it is the pressure of the brake fluid in the primary hydraulic chamber 15 that causes the piston 18 to intervene. Some embodiments, such as the one shown in FIG. 2-5, provide the ability to set the intervention level of the ABS valve unit according to road surface conditions.

Figure 6:
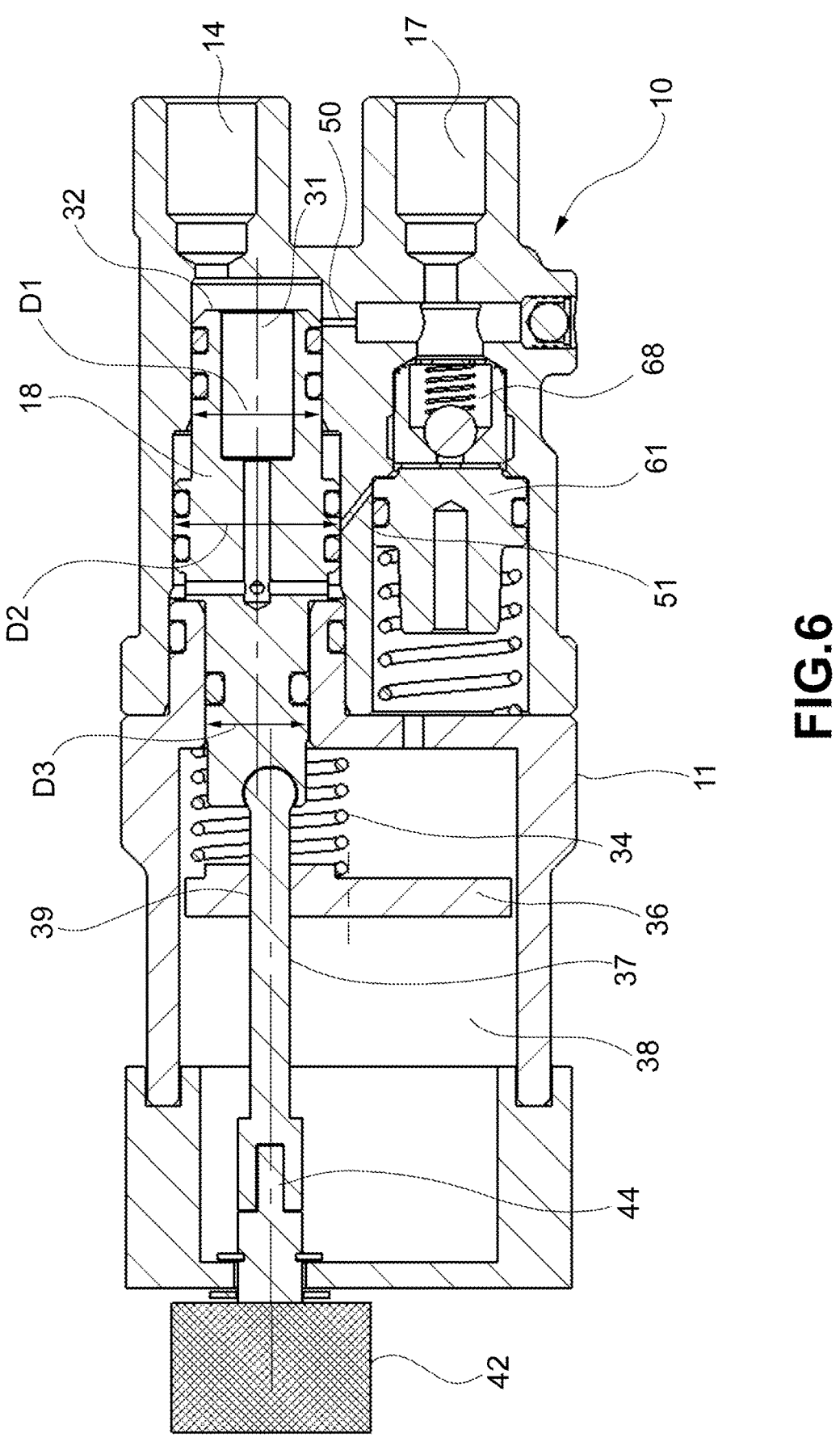
FIG. 6 is a longitudinal cross-sectional view of a valve unit according to another embodiment.

Simplified embodiments may envisage the ABS valve unit being implemented on a vehicle in the absence of an electrical power supply. According to an alternative embodiment, the adjusting device 42 may comprise a manually rotatable knob 42 (FIG. 6) that allows the user to select the degree of pre-compression of the primary elastic element 34 and thus the elastic force acting on the piston 18. Embodiments may provide the possibility of rotating the knob 42 among a plurality of predefined angular positions, each corresponding to a respective level of precompression of the primary elastic element.

As an alternative to a threaded coupling 39 between the stem 37 and the transversal contrast wall 36, an adjustment by means of a member with cam surfaces may be used.

Figure 7:
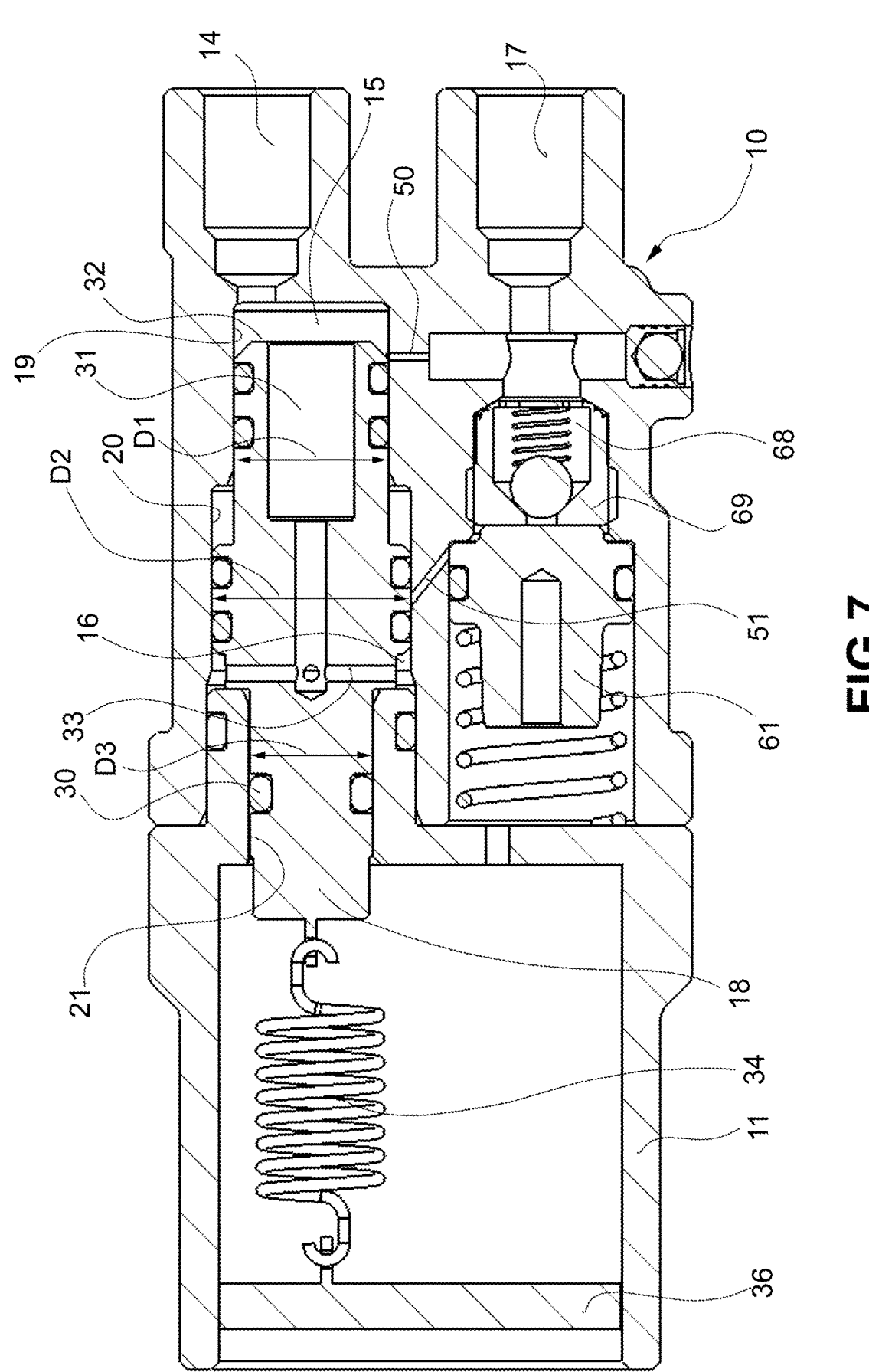
FIG. 7 is a longitudinal cross-sectional view of a valve unit according to a further embodiment.

According to a further embodiment (FIG. 7), which does not require an electrical power supply, the primary elastic element 34 that stresses the piston 18 away from the outlet port 14 may be formed as a traction elastic element, having a first end constrained to the piston 18 and a second end constrained to a transversal contrast wall 36. The transversal contrast wall may be fixed with respect to the body 11 or adjustable in a longitudinal position to adjust the pre-tensioning of the primary elastic element 34 and thus the traction force acting on the piston as it moves away from the outlet port, as required.

According to other embodiments (not shown), an adjusting device 42 may be associated with a primary elastic element 34 implemented as a traction spring, to adjust the pre-tensioning thereof.

While specific embodiments of the invention have been described, it should be understood that this disclosure has been provided purely for illustrative purposes and that the invention should not be limited in any way thereby. Various changes will become apparent to persons skilled in the art in light of the above examples. The scope of the invention is limited only by the appended claims.

What is claimed is:

1. A valve unit for an anti-lock braking system of a vehicle, the valve unit comprising:
   a valve body with an outlet port hydraulically connectable to a brake caliper, an inlet port hydraulically connectable to a master cylinder, a primary chamber in fluid communication with the outlet port, an expansion chamber with an outflow passage establishing fluid communication between the primary chamber and the expansion chamber, and a bypass passage establishing fluid communication between the inlet port and the outlet port;
   a piston movable longitudinally in the primary chamber and having a longitudinal cavity that extends through the piston between an end face of the piston, facing the outlet port, and a transversal passage that opens onto a lateral surface of the piston, the piston having overall a first transversal surface, facing the outlet port, and a second transversal surface opposite to the first transversal surface and facing away from the outlet port, and where the first transversal surface has an area smaller than an area of the second transversal surface;
   at least one elastic element that exerts an elastic force to move the piston away from the outlet port,
   wherein the piston has two alternative operational positions:
   a first position, under normal braking conditions, in which the elastic force of the elastic element prevails over a longitudinal component of a hydraulic thrust of a brake fluid present in the primary chamber, whereby the piston is moved away from the outlet port and occludes the outflow passage without occluding the bypass passage, and
   a second position, in activated conditions of the valve unit, in which the hydraulic thrust of the brake fluid present in the primary chamber has a longitudinal component that prevails over the elastic force exerted by the elastic element, whereby the piston is displaced towards the outlet port and occludes the bypass passage while the piston does not occlude the outflow passage.

2. The valve unit of claim 1, wherein:
   the primary chamber forms
   a first section arranged closer to the outlet port and having a first diameter,
   a third section arranged farther from the outlet port and having a third diameter smaller than the first diameter, and
   a second section, intermediate between the first section and the third section, having a second diameter greater than the first diameter;
   the piston comprises
   a first portion sealingly sliding in the first section of the primary chamber,
   an intermediate portion sealingly sliding in the second section of the primary chamber, and
   a third portion sealingly sliding in the third section of the primary chamber;
   whereby
   said first transversal surface has the area of a circle having the first diameter, and
   said second transversal surface has the area of an annular crown having an external circumference with a diameter corresponding to the second diameter and an internal circumference with a diameter corresponding to the third diameter.

3. The valve unit of claim 1, further comprising an adjusting device for adjusting the elastic force exerted by the elastic element on the piston.

4. The valve unit of claim 1, wherein the valve unit further comprises:
   a transversal shoulder facing away from the outlet port and integral with the valve body,
   a transversal contrast wall, facing the transversal shoulder and longitudinally spaced therefrom,
   a stem connecting the transversal contrast wall to the piston and making the piston longitudinally integral with the transversal contrast wall,
   and wherein the elastic element is a compression spring, compressed longitudinally between the transversal contrast wall and the transversal shoulder.

5. The valve unit of claim 4, wherein the valve unit comprises an adjusting device for adjusting the elastic force exerted by the elastic element on the piston, and wherein the adjusting device is configured to adjust a longitudinal distance between the transversal contrast wall and the transversal shoulder.

6. The valve unit of claim 5, wherein the stem comprises a threaded stem portion engaging in a correspondingly threaded through hole formed through the transversal contrast wall, whereby a rotation imparted to the stem about its longitudinal axis causes a variation of a longitudinal distance between the transversal contrast wall and the piston.

7. The valve unit of claim 6, wherein the stem comprises an enlarged terminal head of circular cross section, engaged in a recess formed in the piston.

8. The valve unit of claim 6, wherein the longitudinal axis of the stem is eccentric with respect to a longitudinal axis of the piston.

9. The valve unit claim 6, wherein the stem has a longitudinal axis and the transversal contrast wall has a peripheral edge of which at least a part has a transversal distance from the longitudinal axis of the stem greater than a minimum transversal distance between the longitudinal axis of the stem and an inner surface of a chamber formed in the valve body, and wherein said inner surface transversely faces the stem and acts as a stop to block rotation of the transversal contrast wall when the stem is rotated.

10. The valve unit of claim 6, wherein the adjusting device is rotationally coupled to the stem by a splined longitudinal coupling that allows relative longitudinal movements between the adjusting device and the stem.

11. The valve unit of claim 4, wherein the transversal contrast wall is received with transversal play and is longitudinally movable within a chamber formed by the valve body.

12. The valve unit of claim 1, wherein the elastic element is an elastic traction element, having a first end constrained to the piston and a second end constrained to a transversal contrast wall integral with the valve body.

13. The valve unit of claim 12, wherein the transversal contrast wall is either fixed with respect to the valve body or adjustable in a longitudinal position to adjust a pre-tensioning of the elastic element and therefore a traction force acting on the piston away from the outlet port.

14. The valve unit of claim 3, wherein the adjusting device comprises an electric drive electrically connectable to an electronic control (ECU) unit mounted on board of the vehicle.

15. The valve unit of claim 3, wherein the adjusting device comprises a manually adjustable mechanism.

16. The valve unit of claim 1, wherein the expansion chamber accommodates a longitudinally slidable floating valve element and a secondary spring element urging the longitudinally slidable floating valve element towards the inlet port, wherein the expansion chamber is in fluid communication with the inlet port through a channel, and wherein a one-way valve is mounted between the expansion chamber and the inlet port, allowing the brake fluid to flow through the one-way valve in only one direction, from the expansion chamber toward the inlet port.

17. The valve unit of claim 16, wherein the longitudinally slidable floating valve element is movable within the expansion chamber between a shoulder of the valve body arranged in the expansion chamber closest to the inlet port and a transversal wall, arranged in the expansion chamber farthest from the inlet port, and wherein the outflow passage opens onto the expansion chamber at a position located longitudinally adjacent to the shoulder.

18. The valve unit of claim 4, wherein the elastic element comprises at least two compression springs between the transversal contrast wall and the transversal shoulder, and wherein a first spring of the at least two compression springs is always longitudinally pre-compressed between the transversal contrast wall and the transversal shoulder, and a second spring of the at least two compression springs has a shorter free length than the first spring and is not longitudinally pre-compressed between the transversal contrast wall and the transversal shoulder.

* * * * *